United States Patent
Yamamoto et al.

(10) Patent No.: US 6,794,444 B2
(45) Date of Patent: Sep. 21, 2004

(54) SILICONE EMULSION COMPOSITION ADHERENT TO PLASTIC FILM SUBSTRATES AND RELEASE FILM

(75) Inventors: Kenji Yamamoto, Gunma-ken (JP); Shinji Irifune, Gunma-ken (JP); Tutomu Nakajima, Gunma-ken (JP); Masahiko Ogawa, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/327,887

(22) Filed: Dec. 26, 2002

(65) Prior Publication Data

US 2003/0134131 A1 Jul. 17, 2003

(30) Foreign Application Priority Data

Dec. 26, 2001 (JP) ......................................... 2001-393176

(51) Int. Cl.[7] .............................................. C08G 77/08
(52) U.S. Cl. ........................ 524/588; 524/837; 528/15; 528/32; 528/31; 556/455
(58) Field of Search ................................ 524/588, 837; 528/15, 31, 32; 556/455

(56) References Cited

U.S. PATENT DOCUMENTS

| 3,900,617 | A | | 8/1975 | Grenoble |
| 4,293,671 | A | * | 10/1981 | Sasaki et al. ................ 525/478 |
| 4,772,515 | A | | 9/1988 | Hara et al. |
| 5,331,077 | A | * | 7/1994 | Braun et al. ................... 528/31 |
| 5,616,672 | A | * | 4/1997 | O'Brien et al. ................ 528/15 |
| 5,965,683 | A | | 10/1999 | Nye et al. |
| 5,981,670 | A | * | 11/1999 | Itoh et al. .................... 525/478 |
| 6,063,889 | A | * | 5/2000 | Friebe et al. .................. 528/32 |
| 6,388,005 | B1 | * | 5/2002 | Morita et al. ................ 524/837 |
| 6,425,600 | B1 | * | 7/2002 | Fujiki et al. .............. 280/728.1 |

FOREIGN PATENT DOCUMENTS

| EP | 1277802 A1 | 1/2003 |
| GB | 1 599 209 | 9/1981 |
| JP | 54-52160 A | 4/1979 |
| JP | 57-53143 B2 | 11/1982 |
| JP | 63-314275 A | 12/1988 |
| JP | 6-57144 A | 3/1994 |
| JP | 11-222557 A | 8/1999 |

* cited by examiner

*Primary Examiner*—Margaret G. Moore
(74) *Attorney, Agent, or Firm*—Birch, Stewart, Kolasch & Birch, LLP.

(57) ABSTRACT

A silicone emulsion composition of the addition reaction curing type comprising a major proportion of an organopolysiloxane containing at least two alkenyl radicals and T units and having a viscosity of 5–100 mPa·s, a minor proportion of another organopolysiloxane containing at least two alkenyl radicals and having a 30% toluene diluted viscosity of 1,000–10,000 mPa·s, an organohydrogenpolysiloxane, a platinum radical metal catalyst, a surfactant, and water cures into a coating that adheres well to plastic film substrates. The cured coating exhibits release properties to pressure-sensitive adhesives and can be utilized as release film.

5 Claims, No Drawings

SILICONE EMULSION COMPOSITION ADHERENT TO PLASTIC FILM SUBSTRATES AND RELEASE FILM

This invention relates to a silicone emulsion composition which is adherent to plastic film substrates, and a release film using the same.

BACKGROUND OF THE INVENTION

In the release paper art, there are known a variety of silicone release compositions for use in preventing any sticking or adhesion between substrates of paper, plastics or the like and pressure-sensitive adhesives. Of these, solvent type silicone compositions have been widely used because of release properties and relatively loose substrate selectivity.

However, from the standpoints of environmental pollution, safety and health, it now becomes necessary to take countermeasures to reduce the amount of solvent used or to recover the solvent to stop discharge to the exterior. One effective means of reducing the amount of solvent used is use of solventless silicone compositions. In order to apply the solventless silicone compositions to paper, laminate paper or plastic film substrates uniformly to a thickness of 1 μm or less, an expensive applicator and a sophisticated technique are necessary. In general, most manufacturers hesitate to accept the change from the solvent type silicone to the solventless type silicone.

Another effective means of reducing the amount of solvent used is use of emulsion type silicone compositions. Silicone compositions of this type are known and used in the art. For example, JP-B 57-53143 discloses a composition obtained by mixing an emulsion composed of an organovinylpolysiloxane, a platinum compound, an emulsifier and water with another emulsion composed of an organohydrogenpolysiloxane, an emulsifier and water. Also known are a silicone composition produced by emulsion polymerization (see JP-A 54-52160), and a composition obtained by emulsifying an organovinylsiloxane and an organohydrogenpolysiloxane with a specific emulsifier and mixing the emulsion with an emulsion of a platinum compound (see JP-A 63-314275).

Since these emulsion type silicone compositions can be diluted with water to any desired concentration, an expensive applicator and a sophisticated technique for thin film coating are not necessary as opposed to the solventless type, and their ease of application is approximate to the solvent type.

However, emulsion type silicone compositions have not enjoyed widespread use because of drawbacks associated with water as the dispersing medium. One drawback is that high temperature cure is necessary due to the latent heat of water for evaporation, indicating poor curability as compared with the solvent and solventless types. Another drawback is that wettability and adhesion to substrates are poor because of the surface tension of water. These drawbacks become serious especially with plastic film substrates.

A number of proposals have been made to solve these problems. For example, JP-A 6-57144 uses an organopolysiloxane having alkenyl radicals at molecular ends, and JP-A 11-222557 discloses blending of an emulsion of a non-silicone polymer. Most of these compositions are intended to apply to paper substrates, and fail to achieve satisfactory adhesion when applied to plastic film substrates.

SUMMARY OF THE INVENTION

An object of the invention is to provide a silicone emulsion composition capable of curing into a product effectively adherent to plastic film substrates, and a release film obtained by applying the silicone emulsion composition to a plastic film substrate and curing thereto.

It has been found that a silicone emulsion composition of the addition reaction curing type comprising an organopolysiloxane having at least two alkenyl radicals in a molecule, which contains at least 50% by weight of an organopolysiloxane (I) having the average compositional formula (1), shown below, is effectively adherent to plastic film substrates.

Therefore, the invention provides a silicone emulsion composition of the addition reaction curing type comprising an organopolysiloxane having at least two alkenyl radicals in a molecule, the organopolysiloxane comprising at least 50% by weight of an organopolysiloxane (I) having the following average compositional formula (1).

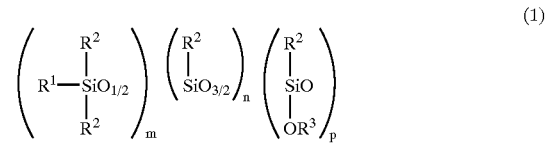

Herein $R^1$ is an alkenyl radical, $R^2$ is a monovalent hydrocarbon radical, $R^3$ is hydrogen or an alkyl radical, m and n are positive numbers and p is 0 or a positive number, satisfying $0.6 \leq (n+p)/m \leq 1.5$, and $0 \leq p/(n+p) \leq 0.05$, and m, n and p are such that the organopolysiloxane (I) has a viscosity of 5 to 100 mPa·s at 25° C.

DESCRIPTION OF THE PREFERRED EMBODIMENTS

The silicone emulsion composition of the invention is of the type that it cures through addition reaction and contains as a major component an organopolysiloxane having at least two alkenyl radicals in a molecule. At least 50% by weight of the alkenyl-bearing organopolysiloxane is an organopolysiloxane (I) having the average compositional formula (1). If the organopolysiloxane (I) accounts for less than 50% by weight of the alkenyl-bearing organopolysiloxane, the composition is less adherent to plastic film substrates.

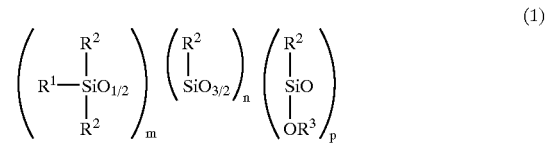

Herein $R^1$ is an alkenyl radical, $R^2$ is a monovalent hydrocarbon radical, $R^3$ is hydrogen or an alkyl radical, m and n are positive numbers and p is 0 or a positive number, satisfying $0.6 \leq (n+p)/m \leq 1.5$, and $0 \leq p/(n+p) \leq 0.05$, and m, n and p are such that the organopolysiloxane (I) has a viscosity of 5 to 100 mPa·s at 25° C.

In formula (1), $R^1$ is an alkenyl radical, $R^2$ is a monovalent hydrocarbon radical, and $R^3$ is hydrogen or an alkyl radical. The alkenyl radicals represented by $R^1$ are preferably those of 2 to 8 carbon atoms, for example, vinyl, allyl, butenyl and pentenyl. The monovalent hydrocarbon radicals represented by $R^2$ are preferably those of 1 to 8 carbon atoms, for example, alkenyl radicals such as vinyl, allyl, butenyl and pentenyl, alkyl radicals such as methyl and ethyl, and aryl radicals such as phenyl. $R^2$ radicals may be different from each other. The alkyl radicals represented by $R^3$ are preferably those of 1 to 8 carbon atoms, more preferably 1 to 6 carbon atoms, for example, methyl and ethyl. From the industrial aspect, vinyl is the preferred alkenyl radical.

The subscripts m and n are positive numbers and p is 0 or a positive number, satisfying $0.6 \leq (n+p)/m \leq 1.5$, preferably $0.7 \leq (n+p)/m \leq 1.4$. If $(n+p)/m$ is less than 0.6, then the effect of improving adhesion to plastic film is degraded. A $(n+p)/m$ value of more than 1.5 indicates too large a proportion of $R^2SiO_{3/2}$ and $R^2(R^3O)SiO_{2/2}$, which makes difficult the synthesis of organopolysiloxane (I). The subscripts n and p also satisfy $0 \leq p/(n+p) \leq 0.05$, and preferably $0 \leq p/(n+p) \leq 0.04$. A $p/(n+p)$ value of more than 0.05 indicates too large a quantity of alkoxy or hydroxyl radicals, which adversely affects the cure of the silicone emulsion composition.

In the organopolysiloxane having at least two alkenyl radicals in a molecule, it is preferred that trifunctional siloxane units (T units) constitute 35 to 60 mol % of the entire siloxane units, and alkenyl radicals constitute at least 20 mol %, more preferably 20 to 90 mol %, even more preferably 20 to 80 mol % of the entire organic radicals. A trifunctional siloxane unit content of less than 35 mol % may adversely affect the adhesion to plastic film substrates whereas an organopolysiloxane containing more than 60 mol % of trifunctional siloxane units may be difficult to emulsify, failing to form a stable emulsion. Likewise, an alkenyl radical content of less than 20 mol % of the entire organic radicals may adversely affect the adhesion to plastic film substrates.

It is noted that the organopolysiloxane (I) may contain alkenyl-free monofunctional siloxane units, difunctional siloxane units, and tetrafunctional siloxane units as long as the benefits of the invention are not impaired.

The organopolysiloxane (I) should preferably have a viscosity of 5 to 100 mPa·s at 25° C., and more preferably 10 to 100 mPa·s at 25° C. A viscosity of less than 5 mPa·s leads to poor cure whereas a viscosity of more than 100 mPa·s leads to poor adhesion. Accordingly, m, n and p in formula (1) should be selected so as to give a viscosity within the above range.

The organopolysiloxane (I) can be prepared by well-known methods. One exemplary method involves the steps of effecting co-hydrolysis of a trialkoxymethylsilane, a dialkenyltetramethyldisiloxane and hexamethyldisiloxane in an alcohol solvent in the presence of an acid catalyst, neutralizing the reaction product, removing the alcohol by-product, and washing the product with water for removing unreacted reactants, thereby obtaining the end organopolysiloxane.

The alkenyl-bearing organopolysiloxane serving as the major component in the silicone emulsion composition of the invention must contain at least 50% by weight of organopolysiloxane (I) while the less than 50% by weight remainder may be any organopolysiloxane as long as it has at least two alkenyl radicals in a molecule and does not impede emulsification and the stability of the resulting emulsion.

In one preferred embodiment which is to impart better properties to the release film produced using the silicone emulsion composition of the invention, another organopolysiloxane (II) having the general formula (2), shown below, is used as the alkenyl-bearing organopolysiloxane component other than organopolysiloxane (I).

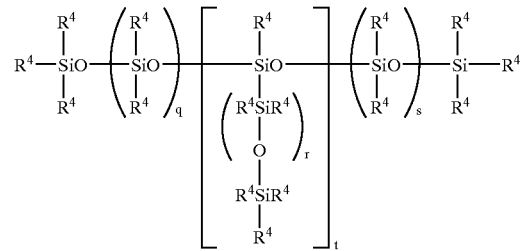

(2)

Herein $R^4$ is a monovalent hydrocarbon radical, at least two of the $R^4$ radicals are alkenyl radicals, t is a number of 0 to 15, and q, r, s and t are such numbers that the organopolysiloxane (II) has a viscosity from 100 mPa·s at 25° C. to a 30% toluene diluted viscosity of 20,000 mPa·s at 25° C.

More particularly, $R^4$ is selected from monovalent hydrocarbon radicals, preferably having 1 to 8 carbon atoms, for example, alkenyl radicals such as vinyl, allyl, butenyl and pentenyl, alkyl radicals such as methyl and ethyl, and aryl radicals such as phenyl. $R^4$ radicals may be different from each other as long as at least two are alkenyl radicals.

The other organopolysiloxane (II) has a viscosity at 25° C. from 100 mPa·s to a 30% toluene diluted viscosity of 20,000 mPa·s, and preferably a 30% toluene diluted viscosity of from 1,000 to 10,000 mPa·s at 25° C. A viscosity of less than 100 mPa·s may render the silicone emulsion composition less stable during storage whereas a 30% toluene diluted viscosity in excess of 20,000 mPa·s may impede emulsification.

The subscript t is in the range: $0 \leq t \leq 15$. The remaining subscripts q, r and s are any numbers as long as the organopolysiloxane (II) has a viscosity in the above range. With t in excess of 15, the organopolysiloxane (II) can gel during synthesis.

In the mixture, 100 parts by weight of organopolysiloxane (I) is mixed with 10 to 100 parts by weight of organopolysiloxane (II). With less than 10 parts of organopolysiloxane (II), the cured coating may require an increased release or peeling force so that the release film becomes impractical whereas more than 100 parts by weight of organopolysiloxane (II) may detract from the adhesion to plastic film substrates.

Among the components of the silicone emulsion composition of the invention, organopolysiloxane (II) is a dominant component to the release force of the composition. By altering the structure and substituent radicals of organopolysiloxane (II), the release properties of a cured coating of the silicone emulsion composition can be controlled.

The organopolysiloxane (II) may be used alone or a mixture of two or more such organopolysiloxanes may be used as long as their average meets the requirements of the above average compositional formula (2). Better results of adhesion, release properties, and especially, abrasion resistance are obtained when 10 to 50% by weight of the organopolysiloxane (II) has a viscosity at 25° C. of 1,000 to 10,000 mPa·s, when expressed in a 30% toluene diluted viscosity, and an alkenyl content of at least 0.02 mol/100 g.

In a preferred embodiment of the invention, the silicone emulsion composition contains
(A) 100 parts by weight of the organopolysiloxane (I),
(B) 10 to 100 parts by weight of the organopolysiloxane (II),
(C) 30 to 100 parts by weight of an organohydrogenpolysiloxane having at least two hydrogen atoms each directly attached to a silicon atom (i.e., SiH radicals) in a molecule, (D) 0.1 to 20 parts by weight, per 100 parts by weight of components (A), (B) and (C) combined, of a surfactant, (E) a catalytic amount of a platinum radical metal catalyst, and (F) 100 to 10,000 parts by weight of water.

Component (C), organohydrogenpolysiloxane should have at least two hydrogen atoms each directly attached to a silicon atom (i.e., SiH radicals) in a molecule. Since the SiH radicals undergo addition reaction with alkenyl radicals on organopolysiloxanes (I) and (II), the organohydrogenpolysiloxane serves as a crosslinker for forming a cured coating. Preferably it has the following average compositional formula (3).

$$R^5{}_aH_bSiO_{(4-a-b)/2} \qquad (3)$$

Herein, $R^5$ is selected from substituted or unsubstituted monovalent hydrocarbon radicals, preferably those radicals having 1 to 8 carbon atoms and free of aliphatic unsaturation, for example, alkyl radicals such as methyl, ethyl and propyl, aryl radicals such as phenyl, and halo-substituted alkyl radicals such as 3,3,3-trifluoropropyl. The subscripts "a" and "b" are positive numbers satisfying $a+b \leq 3$. Preferably "a" and "b" are in the range: $1 \leq a+b \leq 3$ and $0.1 \leq b \leq 2$, especially $0.2 \leq b \leq 2$.

The amount of organohydrogenpolysiloxane (C) blended is dependent on the amount of alkenyl radicals in components (A) and (B), that is, organopolysiloxanes (I) and (II). When an ability to form a cured coating and its release properties are taken into account, 30 to 100 parts by weight of organohydrogenpolysiloxane (C) is preferably blended per 100 parts by weight of component (A) or organopolysiloxane (I). Less than 30 parts of the organohydrogenpolysiloxane may be insufficient for the composition to cure whereas more than 100 parts may increase the release force beyond the practical limit.

Component (D) or surfactant is typically a nonionic surfactant. Included are alkyl ether type compounds such as polyoxyethylene lauryl ether and polyoxyethylene tridecyl ether, and alkyl ester type compounds such as polyoxyethylene oleate and polyoxyethylene laurate. These nonionic emulsifiers may be used alone or in admixture of two or more. Advantageously, a stable silicone emulsion composition is obtained when the nonionic emulsifier alone or a mixture thereof has an HLB of 10 to 15.

Anionic and cationic surfactants are also useful, but they are preferably used in combination with the nonionic surfactant for forming a silicone emulsion which is stable and wettable to substrates.

Desirably, the amount of surfactant blended is a minimum amount enough to form a silicone emulsion which is stable and wettable to substrates. Specifically, the amount is 0.1 to 20 parts by weight, especially 0.5 to 15 parts by weight, per 100 parts by weight of components (A), (B) and (C) combined. Less than 0.1 part of the surfactant may be insufficient to promote emulsification whereas more than 20 parts may prevent the silicone emulsion from effective curing.

To help emulsification and to improve stability, a water-soluble resin may be used along with the surfactant. Useful water-soluble resins include polyvinyl alcohol, and a choice is desirably made of one having a minimal poisoning action to the platinum radical metal catalyst. Like the surfactant, the amount of water-soluble resin blended is a minimum amount enough to assist in forming a silicone emulsion which is stable and wettable to substrates. Specifically, the amount is 1 to 10 parts by weight per 100 parts by weight of components (A), (B) and (C) combined.

Component (E) or platinum radical metal catalyst serves to promote addition reaction and is selected from among addition reaction catalysts. Useful platinum radical metal catalysts include platinum, palladium and rhodium base catalysts, with the platinum base catalysts being especially preferred.

Examples of the platinum catalyst include chloroplatinic acid, alcohol and aldehyde solutions of chloroplatinic acid, and complexes of chloroplatinic acid with olefins or vinylsiloxanes.

The platinum radical metal catalyst is added in a catalytic amount, and desirably from the standpoints of good cured coating and economy, an amount of 1 to 1,000 parts by weight of platinum radical metal per million parts by weight of components (A), (B) and (C) combined.

It is preferred that the platinum radical metal catalyst be added after emulsification of components (A) to (D) and immediately before use of the emulsion rather than being emulsified simultaneously with the remaining components. Also preferably, the platinum radical metal catalyst is processed into a water dispersible form prior to its addition. For example, the platinum radical metal catalyst may be previously mixed with the surfactant or formed into an emulsion.

The silicone emulsion composition of the invention may be prepared by well-known methods, and preferably by mixing predetermined amounts of components (A) to (D) and part of water as component (F) in a high shear agitating apparatus such as a planetary mixer or combination mixer, emulsifying the mixture by phase transition, and adding the remainder of water for dilution. Each component may be used alone or in admixture of two or more.

The amount of water may be adjusted so as to give the composition a viscosity for an applicator used in practice and provide a desired silicone coating weight on the substrate. Though not critical, the amount of water is preferably 100 to 10,000 parts by weight per 100 parts by weight of organopolysiloxane (I) as component (A). Less than 100 parts of water may be difficult to form O/W type emulsion whereas more than 10,000 parts may detract from stability.

Water having an impurity concentration as in city water may be used. Use of water having strong acid, strong alkali, large amounts of alcohol or salts admixed therein should be avoided because such water can compromise the stability of emulsion.

Besides the aforementioned components, other optional components may be added if desired. Suitable optional components include catalysis inhibitors for inhibiting the catalysis of platinum radical metal catalysts, such as organic nitrogen compounds, organic phosphorus compounds, acetylene derivatives, oxime compounds, and organic halides; silicone resins, silica or organopolysiloxanes devoid of hydrogen atoms or alkenyl radicals attached to silicon atoms, for controlling release properties; leveling agents such as fluorochemical surfactants; and thickeners such as water-soluble polymers, e.g., methyl cellulose and polyvinyl alcohol. These optional components may be added in conventional amounts insofar as the benefits of the invention are not impaired.

The silicone emulsion composition thus prepared is then applied to plastic film substrates and heat cured to form release films which are ready for use. Useful plastic film substrates include polyolefin films such as biaxially oriented polypropylene films, polyethylene films, and ethylene-propylene copolymer films, and polyester films. The thickness of these film substrates is not critical, but is often in the range of about 5 to about 100 μm.

In applying the silicone emulsion composition to substrates, a gravure coater, air knife coater, roll coater, wire bar or the like may be used. The coating weight is not critical, but is often in the range of about 0.1 to 2.0 g/m² of silicone solids.

After the silicone emulsion composition of the invention is applied to the substrate, the coated substrate may be heated at a temperature of 80 to 160° C. for about 3 minutes to about 5 seconds in a hot air circulation dryer, for example, for forming a cured coating of silicone on the substrate while imparting release or parting properties. Curing of the coating can also be conducted by irradiation of infrared or ultraviolet radiation. Combinations of these curing techniques will improve curing efficiency.

EXAMPLE

Examples of the invention are given below by way of illustration and not by way of limitation. In Examples, parts are by weight, and the physical properties reported in Table 2 are measured by the test methods described below.

Curability

A silicone emulsion composition, immediately after its preparation, was applied to each film substrate in a coating weight of 0.4 g/m² and heated in a hot air dryer at 120° C. for a predetermined time, forming a cured coating. The cured coating was rubbed several times with the finger, and visually observed whether or not it was smeared and rubbed (or crumbled) off. Curability is represented by the time (sec) required for curing.

Adhesion

A silicone emulsion composition, immediately after its preparation, was applied to each film substrate in a coating weight of 0.4 g/m² and heated in a hot air dryer at 120° C. for a predetermined time, forming a cured coating. The cured coating was aged for one day at room temperature before it was rubbed several times with the finger, and visually observed whether or not it was smeared and rubbed (or crumbled) off. This is reported as initial adhesion. Separately, the cured coating was aged for 14 days in a thermostat tank at 50° C. before it was rubbed several times with the finger, and visually observed whether or not it was smeared and rubbed off. This is reported as aged adhesion.

Release Force

A silicone emulsion composition, immediately after its preparation, was cured to a substrate at 120° C. for 30 seconds by the same procedure as the cure test. An acrylic pressure-sensitive adhesive BPS-5127 (Toyo Ink Co., Ltd.) was applied onto the cured coating and heat treated at 100° C. for 3 minutes. Then an overlay film of the same material as the substrate was attached to the surface of the coated substrate on which the adhesive had been applied and treated. The laminate was cut into strips of 5 cm wide and aged one day at room temperature. Using a tensile tester, the overlay film was peeled from the sample at an angle of 1800 and a pull rate of 0.3 m/min. The force (N/5 cm) required for peeling is reported as release force.

Adhesion Retentivity

A cured coating was formed on a substrate by curing a silicone emulsion composition thereto by the same procedure as the release force test. A polyester tape Nitto 31B (trade name, Nitto Denko Co., Ltd.) was attached to the surface of the cured coating, placed under a load of 1976 Pa, and heat treated at 70° C. for 20 hours. Thereafter, the tape was removed and attached to a stainless steel plate again. Using a tensile tester, the force (N/2.5 cm) required to peel the treated tape from the steel plate was similarly measured. A percentage of the force for the treated tape relative to the force required to peel a fresh (untreated) tape from the stainless steel plate is reported as adhesion retentivity.

Next, the preparation of silicone emulsions used in Examples and Comparative Examples is described.

Silicone Emulsion Preparation Example

Preparation of Silicone Emulsion 1

The mixer used was a 5-liter combined emulsifier apparatus including an anchor mixer capable of agitation throughout the vessel and a rotatable disk having small tooth-like protrusions arranged alternately on upper and lower sides along the periphery (K. T. Combi Mix M model, Tokushu Kika Kogyo Co., Ltd.). The mixer was charged with 1,000 parts of a siloxane of the average compositional formula (4) having a viscosity of 27 mPa·s and a vinyl content of 0.58 mol/100 g as the organopolysiloxane (I), 260 parts of a terminal and pendant vinyl radical-bearing dimethylpolysiloxane having a 30% toluene diluted viscosity of 5,000 mPa·s and a vinyl content of 0.070 mol/100 g as the organopolysiloxane (II), 720 parts of methylhydrogenpolysiloxane as the organohydrogenpolysiloxane, 30 parts of polyoxyethylene lauryl ether having an HLB of 13.6 as the surfactant, 1,000 parts of a 10% polyvinyl alcohol aqueous solution as the thickener, and 20 parts of ethynyl cyclohexanol as the catalysis inhibitor. The ingredients were agitated and mixed until uniform. Water, 200 parts, was added to the mixture to induce phase transition, followed by 30 minutes of agitation. Water, 16,570 parts, was added as the water diluent. Further agitation yielded an O/W type Silicone Emulsion 1 having a silicone content of 10%.

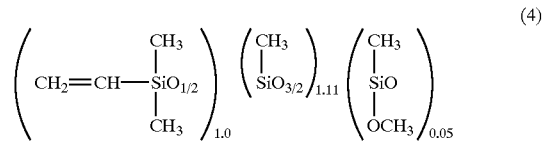

(4)

Preparation of Silicone Emulsion 2

An O/W type Silicone Emulsion 2 having a silicone content of 10% was obtained as in the preparation of Silicone Emulsion 1, aside from omitting the component corresponding to the organopolysiloxane (I), and using 1,952 parts of a terminal vinyl radical-bearing dimethylpolysiloxane having a viscosity of 400 mPa·s and a vinyl content of 0.02 mol/100 g as the organopolysiloxane (II), 42 parts of methylhydrogenpolysiloxane as the organohydrogenpolysiloxane, 6 parts of ethynyl cyclohexanol as the catalysis inhibitor, and 16,710 parts of water as the water diluent.

Preparation of Silicone Emulsion 3

An O/W type Silicone Emulsion 3 having a silicone content of 10% was obtained as in the preparation of Silicone Emulsion 1, aside from using 960 parts of a terminal and pendant vinyl radical-bearing polysiloxane of the average compositional formula (5) and having a viscosity of 35 mPa·s and a vinyl content of 0.60 mol/100 g as the component which satisfied the viscosity and alkenyl content of the organopolysiloxane (I), but were devoid of trifunctional siloxane units (T units), 240 parts of a terminal and pendant vinyl radical-bearing dimethylpolysiloxane having a 30% toluene diluted viscosity of 5,000 mPa·s and a vinyl content of 0.070 mol/100 g as the organopolysiloxane (II), 780 parts of methylhydrogenpolysiloxane as the organohydrogenpolysiloxane (C).

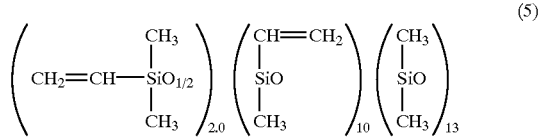

(5)

Example 1

A silicone emulsion composition was prepared by adding 1.5 parts (150 ppm of platinum based on the silicone) of a platinum catalyst emulsion CAT-PM-10A (Shin-Etsu Chemical Co., Ltd.) to 100 parts of Silicone Emulsion 1 and thoroughly mixing them. Table 1 reports the contents of components (A) to (F) in the silicone emulsion composition.

The silicone emulsion composition was determined for cure, adhesion, release force and adhesion retentivity by the respective test methods. The results are shown in Table 2.

Example 2

A silicone emulsion composition was prepared by adding 1.5 parts (150 ppm of platinum based on the silicone) of a platinum catalyst emulsion CAT-PM-10A (Shin-Etsu Chemical Co., Ltd.) to 100 parts of a mixture of 75 parts Silicone Emulsion 1 and 25 parts Silicone Emulsion 2 and thoroughly mixing them. Table 1 reports the contents of components (A) to (F) in the silicone emulsion composition.

The silicone emulsion composition was determined for cure, adhesion, release force and adhesion retentivity by the respective test methods. The results are shown in Table 2.

Comparative Example 1

A silicone emulsion composition was prepared by adding 1.5 parts (150 ppm of platinum based on the silicone) of a platinum catalyst emulsion CAT-PM-10A (Shin-Etsu Chemical Co., Ltd.) to 100 parts of a mixture of 75 parts Silicone Emulsion 3 and 25 parts Silicone Emulsion 2 and thoroughly mixing them. Table 1 reports the contents of components (A) to (F) and a polysiloxane component other than components (A) to (C) in the silicone emulsion composition.

The silicone emulsion composition was determined for cure, adhesion, release force and adhesion retentivity by the respective test methods. The results are shown in Table 2.

Comparative Example 2

A silicone emulsion composition was prepared by adding 1.5 parts (150 ppm of platinum based on the silicone) of a platinum catalyst emulsion CAT-PM-10A (Shin-Etsu Chemical Co., Ltd.) to 100 parts of a mixture of 50 parts Silicone Emulsion 1 and 50 parts Silicone Emulsion 2 and thoroughly mixing them. Table 1 reports the contents of components (A) to (F) in the silicone emulsion composition.

The silicone emulsion composition was determined for cure, adhesion, release force and adhesion retentivity by the respective test methods. The results are shown in Table 2.

Comparative Example 3

A silicone emulsion composition was prepared by adding 1.5 parts (150 ppm of platinum based on the silicone) of a platinum catalyst emulsion CAT-PM-10A (Shin-Etsu Chemical Co., Ltd.) to 100 parts of Silicone Emulsion 2 and thoroughly mixing them. Table 1 reports the contents of components (A) to (F) in the silicone emulsion composition.

The silicone emulsion composition was determined for cure, adhesion, release force and adhesion retentivity by the respective test methods. The results are shown in Table 2.

TABLE 1

| | | Composition (pbw) | | | | |
| --- | --- | --- | --- | --- | --- | --- |
| | | Example | | Comparative Example | | |
| Component | | 1 | 2 | 1 | 2 | 3 |
| A | Organopolysiloxane (I) | 100 | 100 | — | 100 | — |
| | Other polysiloxane | — | — | 100 | — | — |
| B | Organopolysiloxane (II) | 26 | 91 | 93 | 221 | 100 |
| C | Organohydrogenpolysiloxane | 72 | 73 | 83 | 76 | 2 |
| D | Surfactant[1] | 3 | 3 | 3 | 3 | 3 |
| E | Platinum radical metal catalyst[2] | 150 | 150 | 150 | 150 | 150 |
| F | Water | 1767 | 2361 | 2460 | 3548 | 912 |

Note:
Other polysiloxane is a polysiloxane component other than components (A) to (C), which has approximately the same viscosity and vinyl content as the organopolysiloxane (I), but is devoid of trifunctional siloxane units (T units).
[1] The amount of surfactant is pbw per 100 pbw of components (A) + (B) + (C).
[2] The amount of catalyst is ppm based on the total weight of components (A) + (B) + (C).

TABLE 2

| | | Release properties | | | | |
| --- | --- | --- | --- | --- | --- | --- |
| | | Example | | Comparative Example | | |
| Properties | Substrate | 1 | 2 | 1 | 2 | 3 |
| Curability (sec) | OPP | 20 | 20 | 20 | 20 | 30 |
| Initial adhesion | | ○ | ○ | ○ | ○ | X |
| Aged adhesion | | ○ | ○ | X | X | X |
| Curability (sec) | PET | 30 | 30 | 30 | 30 | 40 |
| Initial adhesion | | ○ | ○ | X | Δ | X |
| Aged adhesion | | ○ | ○ | X | X | X |
| Release force (N/5 cm) | | 0.70 | 0.25 | 0.20 | 0.18 | 0.15 |
| Adhesion retentivity (%) | | 96 | 96 | 97 | 97 | 96 |

Note:
OPP: oriented polypropylene film
PET: polyester film
Adhesion is rated "○" for no rub-off and no smear, "Δ" for some smear, and "X" for rub-off.

Table 2 indicates that the silicone emulsion compositions within the scope of the invention satisfactorily adhere to film substrates, and the release force can be adjusted by changing the amount and type of the organopolysiloxane (II), as demonstrated by Examples 1 and 2. A comparison of Example 1 with Comparative Example 1 reveals that the inclusion of T units in the organopolysiloxane (I) is essential for adhesion. A comparison of Examples 1 and 2 with Comparative Example 2 reveals that high adhesion is not established unless the blend ratio of organopolysiloxane (I)/(II) falls in the range defined by the present invention.

The silicone emulsion composition of the invention cures into a coating that adheres well to plastic film substrates independent of the type of plastic film. The cured coating exhibits release properties to pressure-sensitive adhesives and can be utilized as release film.

Japanese Patent Application No. 2001-393176 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone emulsion composition of the addition reaction curing type comprising an organopolysiloxane having at least two alkenyl radicals in a molecule, said organopolysiloxane comprising at least 50% by weight of an organopolysiloxane (I) having the following average compositional formula (1):

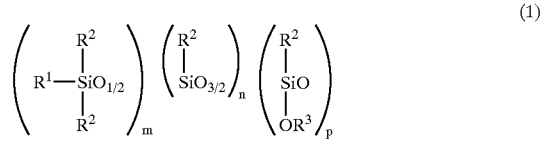
(1)

wherein $R^1$ is an alkenyl radical, $R^2$ is a monovalent hydrocarbon radical selected from the group consisting of alkyl radicals and aryl radicals, $R^3$ is hydrogen or an alkyl radical, m and n are positive numbers and p is 0 or a positive number, satisfying $0.6 \leq (n+p)/m \leq 1.5$, and $0 \leq p/(n+p) \leq 0.05$, and m, n and p are such that the organopolysiloxane (I) has a viscosity of 5 to 100 mPa·s at 25° C.

2. The silicone emulsion composition of claim 1 wherein said organopolysiloxane having at least two alkenyl radicals in a molecule is a mixture of 100 parts by weight of the organopolysiloxane (I) having the average compositional formula (1) and 10 to 100 parts by weight of an organopolysiloxane (II) having the following average compositional formula (2):

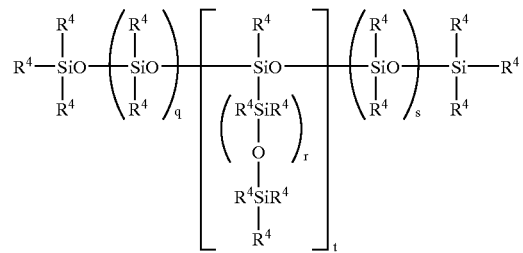
(2)

wherein $R^4$ is a monovalent hydrocarbon radical, at least two of the $R^4$ radicals are alkenyl radicals, t is a number of 0 to 15, and q, r, s and t are such numbers that the organopolysiloxane (II) has a viscosity from 100 mPa·s at 25° C. to a 30% toluene diluted viscosity of 20,000 mPa·s at 25° C.

3. The silicone emulsion composition of claim 2, comprising
    (A) 100 parts by weight of the organopolysiloxane (I) having formula (1),
    (B) 10 to 100 parts by weight of the organopolysiloxane (II) having formula (2),
    (C) 30 to 100 parts by weight of an organohydrogenpolysiloxane having at least two hydrogen atoms each directly attached to a silicon atom in a molecule,
    (D) 0.1 to 20 parts by weight, per 100 parts by weight of components (A), (B) and (C) combined, of a surfactant,
    (E) a catalytic amount of a platinum radical metal catalyst, and
    (F) 100 to 10,000 parts by weight of water.

4. The silicone emulsion composition of claim 2 wherein the organopolysiloxane (II) has a 30% toluene diluted viscosity of 1,000 to 10,000 mPa·s at 25° C. and a vinyl value of at least 0.02 mol/100 g.

5. A release film comprising a plastic film substrate and a cured coating of the silicone emulsion composition of claim 1 formed thereon.

* * * * *